United States Patent
Forney (10) Patent No.: US 11,188,374 B2
(45) Date of Patent: Nov. 30, 2021

(54) DATA MOBILITY FOR IMMOBILE STORAGE SERVICES

(71) Applicant: VMware, Inc., Palo Alto, CA (US)

(72) Inventor: Brian Forney, Mountain View, CA (US)

(73) Assignee: VMWARE, INC., Palo Alto, CA (US)

( * ) Notice: Subject to any disclaimer, the term of this patent is extended or adjusted under 35 U.S.C. 154(b) by 350 days.

(21) Appl. No.: 16/521,381

(22) Filed: Jul. 24, 2019

(65) Prior Publication Data

US 2021/0026673 A1    Jan. 28, 2021

(51) Int. Cl.
*G06F 9/455* (2018.01)
*H04L 29/08* (2006.01)
*H04L 29/06* (2006.01)

(52) U.S. Cl.
CPC ...... *G06F 9/45558* (2013.01); *H04L 63/0281* (2013.01); *H04L 67/28* (2013.01); *H04L 67/2814* (2013.01); *H04L 67/2842* (2013.01); *G06F 2009/4557* (2013.01); *G06F 2009/45562* (2013.01); *G06F 2009/45575* (2013.01); *G06F 2009/45579* (2013.01); *G06F 2009/45583* (2013.01); *G06F 2009/45595* (2013.01)

(58) Field of Classification Search
None
See application file for complete search history.

(56) References Cited

U.S. PATENT DOCUMENTS

| | | | |
|---|---|---|---|
| 8,984,507 B2 * | 3/2015 | Knowles | H04L 67/1008 718/1 |
| 9,900,410 B2 | 2/2018 | Dalal | |
| 10,061,611 B2 | 8/2018 | Tarasuk-Levin et al. | |
| 2012/0290630 A1 * | 11/2012 | Aizman | G06F 16/188 707/827 |
| 2015/0039717 A1 * | 2/2015 | Chiu | H04L 67/1097 709/214 |
| 2020/0382471 A1 * | 12/2020 | Janakiraman | H04L 61/6013 |

* cited by examiner

*Primary Examiner* — Qing Yuan Wu
(74) *Attorney, Agent, or Firm* — Kim & Stewart LLP (57) ABSTRACT

A virtual machine (VM) is migrated from a first data center that includes a data store for handling input/output operations (IOs) of the VM to a second data center that includes a proxy configured with connection information to connect to the data store to enable the proxy to handle IOs in place of the data store. The method of migrating includes installing a first redirection filter in the first data center to redirect IOs from the first VM, which are directed to the data store, to the proxy, migrating a memory state of the first VM to a second VM in the second data center, installing a second redirection filter in the second data center to redirect IOs from the second VM, which are directed to the data store, to the proxy, and after the migration has completed, deactivating the first VM and powering on the second VM.

20 Claims, 6 Drawing Sheets

DATA MOBILITY FOR IMMOBILE STORAGE SERVICES

BACKGROUND

Cloud storage providers provide various storage services, including block, file, and object storage, to structured storage such as relational database services. Through these services, an enterprise is able to store large amounts of data in external storage residing in a data center administered by such cloud storage providers. However, when a workload outside of the data center attempts to access data stored in the data center, the latency for retrieving such data from outside the data center may be high. Further, the cloud storage provider may charge fees for transferring the data into and out of the data center.

As such, the performance and financial cost is significantly higher when workloads are migrated outside the data center and access cloud storage services that remain inside the data center. The problem may be particularly acute for machine learning and analytics workloads which often rely on cloud storage services to process large amounts of data due to scale provided by these services and hardware and software specialization that makes using them more cost effective than other options.

SUMMARY

One or more embodiments provide techniques for setting up a proxy to handle I/O operations issued by a workload, e.g., a virtual machine (VM), to a data store in a first data center after the VM has been migrated to a second data center. The proxy is set up in the second data center and configured with a storage device that is configured as a cache to minimize data transfers between the first and second data centers.

A method of migrating a VM from a first data center to a second data center, according to an embodiment, includes installing a first redirection filter in the first data center to redirect IOs from a source VM, which are directed to the data store, to the proxy, migrating a memory state of the source VM to a destination VM in the second data center, installing a second redirection filter in the second data center to redirect IOs from the destination VM, which are directed to the data store, to the proxy, and after the migration has completed, deactivating the source VM and powering on the destination VM.

Further embodiments include a non-transitory computer-readable storage medium comprising instructions that cause a computer system to carry out the above method, as well as a computer system configured to carry out the above method.

DETAILED DESCRIPTION

Figure 1:
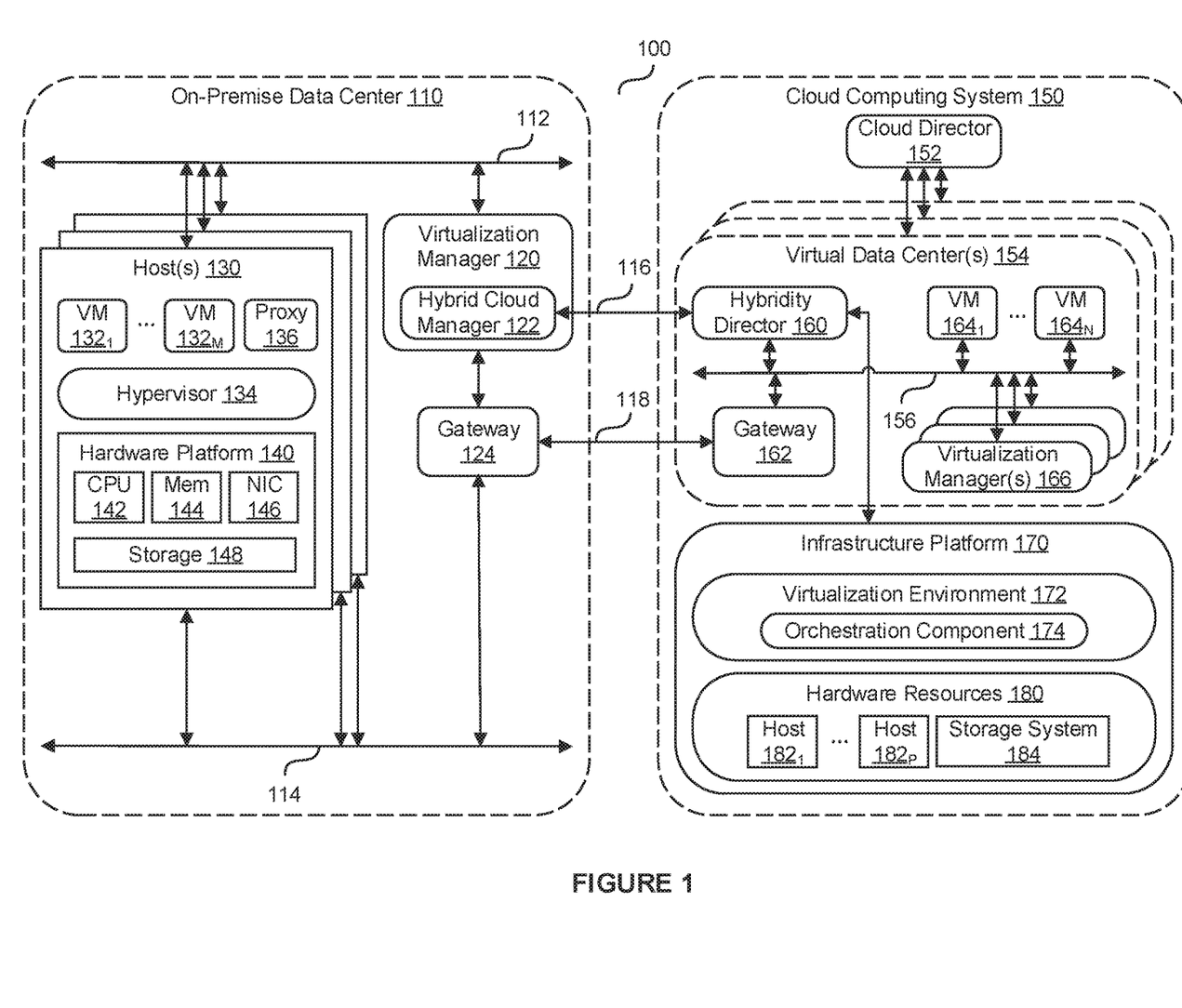
FIG. 1 is a block diagram of a hybrid cloud computing system in which one or more embodiments may be implemented.

FIG. 1 is a block diagram of a hybrid cloud computing system 100 in which one or more embodiments may be implemented. Hybrid cloud computing system 100 is a virtualized computing system implementing an on-premise data center 110 and a cloud computing system 150. Hybrid cloud computing system 100 is configured to provide a common platform for managing and executing virtual machines (VMs) seamlessly between on-premise data center 110 and cloud computing system 150. In one embodiment, on-premise data center 110 may be a data center controlled and administered by a particular enterprise, while cloud computing system 150 may be operated by a cloud computing service provider and exposed as a service available to account holders, such as the particular enterprise in addition to other enterprises. For example, cloud computing system 150 may be operated by Amazon.com, Inc. and the service available to account holders may be the Amazon Simple Storage Service (Amazon S3 for short). On-premise data center 110 may be referred to as a "private cloud," and cloud computing system 150 may be referred to as a "public cloud." In embodiments disclosed herein, a hybrid cloud is a cloud architecture in which an enterprise is provided with seamless access to both public cloud and private cloud resources.

On-premise data center 110 includes one or more hosts 130. Each host 130 may be constructed on a server grade hardware platform 140, such as an x86 architecture platform. As shown, hardware platform 140 of each host 130 includes conventional components of a computing device, such as one or more central processing units (CPUs) 142, system memory 144, a network interface card (NIC) 146, and storage 148. CPU 142 is configured to execute instructions, including executable instructions that perform one or more operations described herein and that may be stored in either memory 144 or storage 148. Memory 144 is a device that allows information, e.g., executable instructions, cryptographic keys, and configurations, to be stored and retrieved. Memory 144 may include one or more random-access memory (RAM) modules. NIC 146 enables host 130 to communicate with another device via a communication medium, e.g. network 114, within on-premise data center 110. Storage system 148 contains local storage devices, e.g., one or more hard disk drives (HDDs), flash memory modules, solid-state drives (SSDs), and optical disks, or a storage interface that enables a host 130 to communicate with one or more network data storage systems. An example of a storage interface is a host bus adapter (HBA) that couples a host 130 to one or more storage arrays, such as a storage array network (SAN). Another example of a storage interface is an NIC that couples a host 130 to network-attached storage (NAS).

Each host 130 is configured to provide a virtualization layer that abstracts CPU 142, memory 144, storage 148, and NIC 146 for use by multiple VMs 132 that run concurrently on the same host 130. VMs 132 run on top of a virtualization layer, i.e., hypervisor 134, that enables sharing of the hardware resources. One example of hypervisor 134 is the VMware ESXi® hypervisor provided as part of the VMware vSphere® solution made commercially available by VMware, Inc. of Palo Alto, Calif. Hypervisor 134 may run on top of an operating system (OS) of a host 130 or directly on hardware components of a host 130.

On-premise data center 110 includes a virtualization management component, i.e., virtualization manager 120, configured to manage and integrate virtualized computing resources of on-premise data center 110 and cloud computing system 150. Virtualization manager 120 communicates with hosts 130 via a management network 112. Virtualization manager 120 is implemented as a computer program residing and executing in on-premise data center 110 or, alternatively, as a VM 132 in one of hosts 130. Virtualization manager 120 may be a VMware vCenter Server® product made commercially available by VMware, Inc. Hybrid cloud manager 122 is configured to deploy VMs in cloud computing system 150, transfer VMs from on-premise data center 110 to cloud computing system 150, and transfer VMs from cloud computing system 150 to on-premise data center 110. In one embodiment, hybrid cloud manager 122 is a module of virtualization manager 120. In another embodiment, hybrid cloud manager 122 is a computer program separate from virtualization manager 120 that executes in a central server or runs in a VM 132. Hybrid cloud manager 122 may be a VMware vCloud Connector® product made commercially available by VMware, Inc.

Hybrid cloud manager 122 is configured to control traffic into network 114 via gateway 124. Gateway 124, e.g., executing as a virtual appliance, is configured to provide VMs 132 and other components in on-premise data center 110 with connectivity to an external network 118, e.g., the Internet. Gateway 124 manages external public internet protocol (IP) addresses for VMs 132 and routes traffic incoming to and outgoing from on-premise data center 110. Gateway 124 may further provide networking services, e.g., firewalls, network address translation (NAT), dynamic host configuration protocol (DHCP), load balancing, and virtual private network (VPN) connectivity over network 118.

Cloud computing system 150 is configured to dynamically provide an enterprise with one or more virtual data centers 154. In each virtual data center 154, an enterprise may provision VMs 164, deploy multi-tier applications on VMs 164, and execute VMs 164. Cloud computing system 150 includes an infrastructure platform 170 upon which a virtual data center 154 may be executed. Infrastructure platform 170 includes hardware resources 180, which includes physical hosts 182 and storage system 184.

In the embodiments illustrated herein, storage system 184 stores data according to a proprietary protocol, such as Amazon's S3 protocol, and input/output operations (IOs) can be performed on storage system 184 using a set of APIs of the proprietary protocol. Because of the proprietary nature of the protocol, storage system 184 cannot be readily replicated in a different cloud computing system. As such, the storage services provided by storage system 184 is hereinafter referred to as "immobile storage service."

Each virtual data center 154 is associated with a particular tenant of cloud computing system 150, such as the enterprise using on-premise data center 110. In one embodiment, a virtual data center 154 is configured as a dedicated cloud service for a single tenant. In this embodiment, the tenant has access to dedicated hardware resources 180 that are physically isolated from hardware resources 180 used by other tenants of cloud computing system 150. In another embodiment, a virtual data center 154 is configured as part of a multi-tenant cloud service with logically-isolated virtualized hardware resources within hardware resources 180. Cloud computing system 150 supports enterprises in both single-tenant and multi-tenant configurations.

Virtualization environment 172 contains an orchestration component 174 that provides infrastructure resources to a virtual data center 154 in response to provisioning requests from a hybridity director 160. Orchestration component 174 may be, e.g., implemented as a process running in a VM. For example, if an enterprise requires a specific number of VMs 164 to deploy an application, orchestration component 174 initiates and manages the instantiation of VMs 164 on hosts 182 to support such requests. Orchestration component 174 further monitors the infrastructure resource consumption levels and requirements of a virtual data center 154 and provides additional infrastructure resources as needed.

Cloud computing system 150 further includes a cloud director 152 that manages allocation of virtual computing resources to enterprises for deploying applications. Cloud director 152 may, e.g., run in one or more VMs and may be accessible to enterprises via a representational state transfer (REST) application programming interface (API). Cloud director 152 may authenticate connection attempts from an enterprise using credentials issued by the provider of a cloud computing service in cloud computing system 150. Cloud director 152 may be the VMware vCloud Director® made commercially available by VMware, Inc.

A virtual data center 154 contains a plurality of VMs 164 and one or more virtualization managers 166. A virtual data center 154 provides an environment in which a VM 164 can be created, stored, and operated, enabling complete abstraction between the consumption of infrastructure service and underlying hardware resources 180. Virtualization managers 166 may be configured similarly to virtualization manager 120. In addition, VMs 164 may be configured similarly to VMs 132: as abstractions of processor, memory, storage, and networking resources of hardware resources 180. One difference between VMs 164 and VMs 132 is that one or more of the VMs 164 employ a driver that converts IOs issued by VMs 164 into IOs that storage system 184 can process using its proprietary protocol, e.g., Amazon's S3 protocol.

A virtual data center 154 includes a virtual network 156 that is managed by a gateway 162 and that allows VMs 164 to communicate with each other. Gateway 162 is further configured to provide VMs 164 and other components in a virtual data center 154 with connectivity to network 118. Gateway 162, which may execute as a virtual appliance, manages external public IP addresses for virtual data centers 154. Gateway 162 is further configured to route traffic incoming to and outgoing from virtual data centers 154 and may provide networking services, e.g., firewalls, NAT, DHCP, and load balancing. In one embodiment, gateway 162 is configured to provide VPN connectivity over network 118 with another VPN endpoint, e.g., gateway 124. In another embodiment, gateway 162 is configured to connect to on-premise data center 110 via a high-throughput, dedicated link 116 between on-premise date center 110 and cloud computing system 150. Gateways 124 and 162 may further be configured with a stretched layer-2 network that spans on-premise data center 110 and a virtual data center 154.

Gateway 162 may comprise multiple gateway components within cloud computing system 150. In some embodiments, a separate gateway 162 is deployed for each virtual data center 154 or for each tenant. In one embodiment, gateway 162 manages traffic with a specific tenant, while a separate gateway manages public-facing traffic to the Internet. In another embodiment, one or more gateways 162 are shared by multiple tenants of cloud computing system 150 and those gateways 162 manage all public-facing traffic incoming to and outgoing from cloud computing system 150.

Each virtual data center 154 contains a hybridity director 160 configured to communicate with a corresponding hybrid cloud manager 122 in on-premise data center 110. This communication enables a common virtualized computing platform between on-premise data center 110 and cloud computing system 150 for an enterprise. Hybridity director 160 may execute as a virtual appliance and may communicate with hybrid cloud manager 120 through Internet-based traffic via either a direct connection 116 or via a VPN tunnel between gateways 124 and 162. Hybridity director 160 controls gateway 162 to process network traffic into a virtual data center 154. Hybridity director 160 further controls VMs 164 and hosts 182 of cloud computing system 150 via infrastructure platform 170.

Hybrid cloud system 100 is configured for cross-system VM migration between on-premise data center 110 and cloud computing system 150. In the embodiments disclosed herein, cloud computing system 150 is the migration source and on-premise data center 110 is the migration destination. However, migration can be reversed using the same techniques that are described herein.

Cross-cloud migration enables users to seamlessly move VMs between their on-premise data centers and public clouds. Cross-cloud VM migration can be either cold migration in which a VM is powered off during migration or hot migration which does not disrupt the execution of a VM during migration. The embodiments disclosed herein involve hot migration of a VM 164 that employ a driver that converts IOs issued by VMs 164 into IOs that storage system 184 can process using its proprietary protocol. Migration of a VM 164 from a host 182 in cloud computing system 150 ("source host") to a host 130 in on-premise data center 110 ("destination host") is coordinated between migration agents installed in hypervisors implemented in the source and destination hosts according to a migration specification. Details of cross-cloud migration are described in U.S. Pat. No. 10,061,611, titled "Virtual Machine Migration within a Hybrid Cloud System," the entire contents of which are incorporated by reference herein.

In the embodiments illustrated herein, a proxy 136 is implemented in on-premise data center 110 as a VM running in host 130 and the data store for proxy 136 is provisioned as a virtual disk. Alternatively, proxy 136 may be implemented as a hardware appliance, in which case the data store for proxy 136 would be provisioned as a locally attached storage device. In either case, proxy 136 functions as a proxy for the immobile data storage service. As such, IOs are performed on proxy 136 in place of storage system 184. However, if the data requested by a read IO is not cached in a data store of proxy 136, proxy 136 retrieves the requested data from the immobile storage service and, upon receipt of the requested data, proxy 136 caches the received data in its data store.

Figure 2:
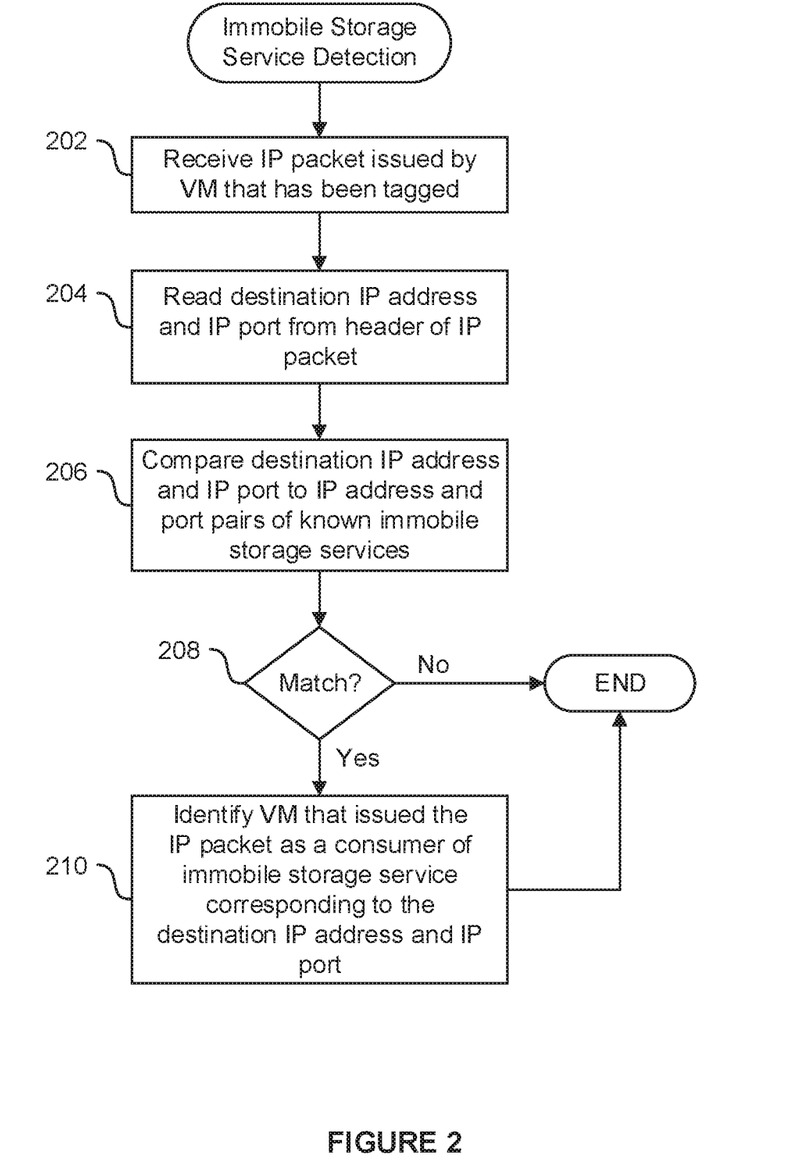
FIG. 2 is a flow diagram that illustrates a method of automatically detecting which immobile storage service a VM uses.

FIG. 2 is a flow diagram that illustrates a method of automatically detecting which immobile storage service a VM uses based on outgoing network traffic from the VM. This automatic detection is preceded by an administrator tagging a VM that could potentially be a consumer of an immobile storage service, for example by an administrator who may not know if the VM is a consumer of an immobile storage service because he or she did not deploy the VM. When the tag is detected by virtualization manager 166, virtualization manager 166 installs a distributed virtual filter (DV filter) in the hypervisor that is supporting execution of the VM. The steps of FIG. 2 are carried out by this DV filter. This DV filter is in the hypervisor kernel, also referred to as "VMkernel" and the details of the DV filter is described in U.S. Pat. No. 9,900,410, the entire contents of which are incorporated by reference herein.

The method of FIG. 2 begins at step 202, where the DV filter intercepts an IP packet issued by the VM that has been tagged. Then, the DV filter at step 204 reads the header of the IP packet to determine the packet's destination IP address and IP port, and at step 206, compares the destination IP address and IP port to a list of IP address and IP port pairs of known immobile storage services. If the DV filter determines at step 208 that there is a match, the DV filter at step 210 records the identity of the VM that issued the IP packet as a consumer of immobile storage service corresponding to the destination IP address and IP port. The administrator uses the recorded information to generate a proxy specification that contains information necessary to configure proxy 136. If the DV filter determines at step 208 that there is no match, the process ends.

Figure 3A:
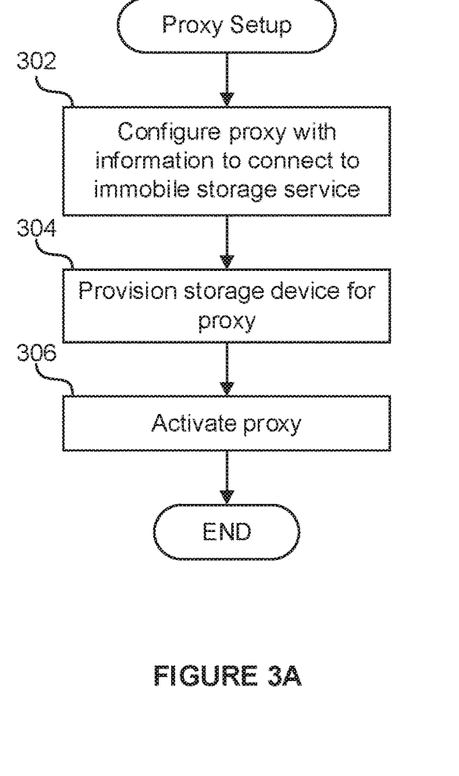
FIG. 3A is a flow diagram that illustrates a method of setting up a proxy of an immobile storage service.

FIG. 3A is a flow diagram that illustrates a method of setting up a proxy 136 of the immobile storage service for a VM (e.g., the VM identified in step 210 as described above). This method is carried out by an administrator but may also be carried out programmatically according to an executable script.

At step 302, the administrator configures proxy 136 with information to connect to the immobile storage service. Such connection information includes authentication information, such as a username and password that the VM uses to access the immobile storage service, and an IP address and IP port of the immobile storage service (e.g., the IP address and IP port recorded at step 210 as described above). At step 304, the administrator also provisions a storage device in on-premise data center 110 for proxy 136 to cache immobile storage service data. Step 306 represents the activation of proxy 136 so that from this point forward all IOs from the VM that target the immobile storage service will be serviced by proxy 136. For write IOs, proxy 136 can be configured as a write-through cache or a write-back cache.

Figure 3B:
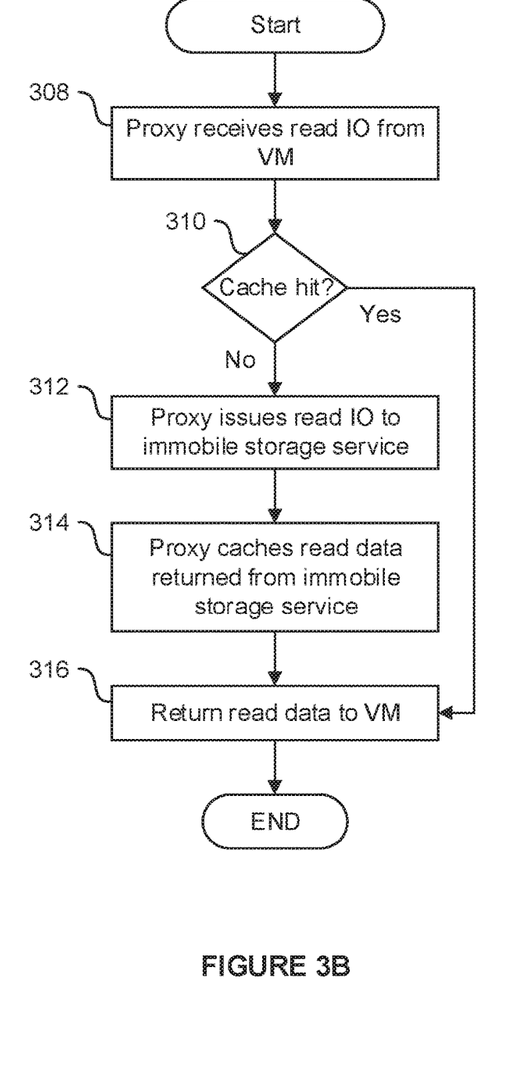
FIG. 3B is a flow diagram that illustrates a method of processing cache misses by the proxy of the immobile storage service.

FIG. 3B is a flow diagram that illustrates a method of processing cache misses by proxy 136 that has been set up in accordance with the method of FIG. 3A. A "cache miss" occurs when proxy 136 is unable to process a read IO using data that proxy 136 has cached in its storage device and instead proxy 136 has to retrieve the data from the immobile storage service.

The method of FIG. 3B begin at step 308, where proxy 136 receives a read IO and searches its storage device for the data requested in the read IO. If proxy 136 is able to find the data (step 310, Yes), the method skips to step 316. If not (step 310, No), then proxy 136 issues a read IO to the immobile storage service for the requested data. When the requested data is returned from the immobile storage service, proxy 136 at step 314 caches it in its storage device and at step 316 returns the requested data to the VM.

In order to reduce the number of cache misses, it is possible to execute a background process for proxy 136 to issue a read operation on all data of the VM stored in the immobile storage service, to cache the data returned in response to the issued read operation in its storage device.

The method of FIG. 2 may be repeated for all VMs that employ an immobile storage service and a proxy may be set up for such VMs in accordance with the methods of FIGS. 3A and 3B. If there are multiple VMs that employ the immobile storage service, the same proxy may be used for all the VMs so long as they employ the same immobile storage service or immobile storage services that employ the same storage protocol.

Figure 4:
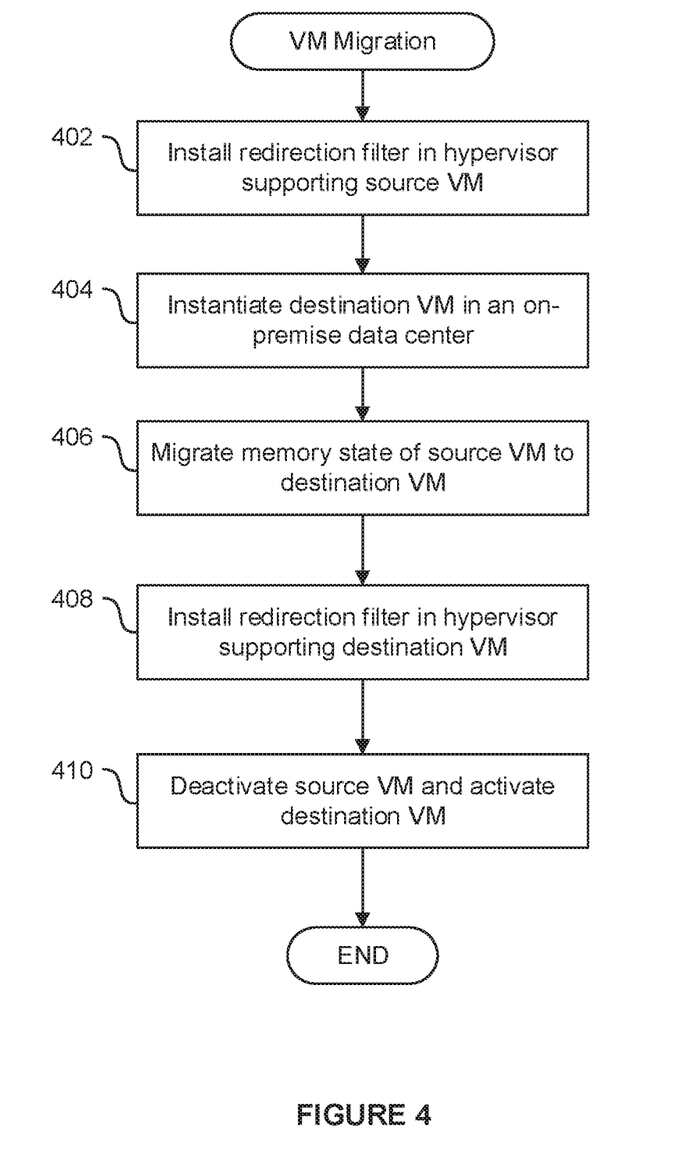
FIG. 4 is a flow diagram that illustrates a method of performing a hot migration of a VM from a cloud computing system to an on-premise data center.

FIG. 4 is a flow diagram that illustrates a method of performing a hot migration of a VM 164 from a source host 182 in cloud computing system 150 to a destination host 130 in on-premise data center 110. The method is coordinated between and carried out automatically by migration agents installed in hypervisors configured in the source host 182 and the destination host 130 according to a migration specification. The migration agent in the source host 182 is referred to herein as the "source agent" and the migration agent in the destination host 130 is referred to herein as the "destination agent."

At step 402, the source agent installs a source redirection filter in the hypervisor in the source host 182 to redirect IP packets bound for the immobile storage service to proxy 136 as described below in conjunction with FIG. 5 and to process inbound packets from proxy 136 in the manner described below in conjunction with FIG. 6. Configuring the source redirection filter includes storing the IP address and IP port of proxy 136 and the IP address and IP port of the immobile storage service employed by VM 164. The source redirection filter is in the hypervisor kernel and is a modified form of the DV filter described above.

At step 404, the destination agent instantiates a new VM in destination host 130. This new VM is one of VMs 132 and for ease of reference will be referred to as "VM 132." At step 406, after VM 132 has been instantiated, the migration agents communicate to transfer the memory state of VM 164 to VM 132.

At step 408, the destination agent installs a destination redirection filter in the hypervisor 134 in the destination host 130 to redirect IP packets bound for the immobile storage service to proxy 136 as described below in conjunction with FIG. 5 and to process inbound packets from proxy 136 in the manner described below in conjunction with FIG. 6. Configuring the destination redirection filter includes storing the IP address and IP port of proxy 136 and the IP address and IP port of the immobile storage service employed by VM 164 and to be employed by VM 132 when the migration completes. The destination redirection filter is in the hypervisor kernel and is a modified form of the DV filter described above.

At step 410, after the entire memory state of VM 164 has been transferred to VM 132, the source agent deactivates VM 164 and the destination agent activates VM 132. Hot migration is considered complete after step 410 and so the hot migration process ends after step 410.

Figure 5:
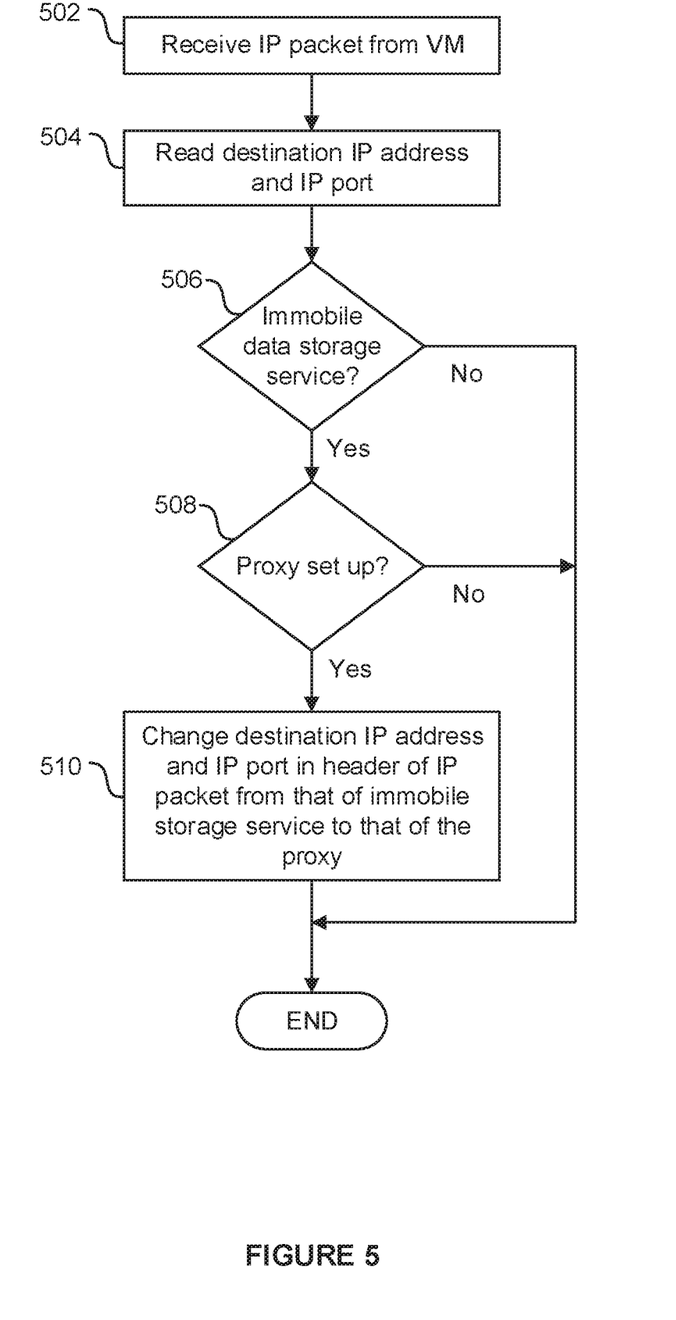
FIG. 5 is a flow diagram that illustrates a method of redirecting outbound IP packets to a proxy.

FIG. 5 is a flow diagram that illustrates a method of redirecting outbound IP packets to a proxy 136. The method of FIG. 5 is carried out by a redirection filter, e.g., either the source redirection filter (before or during hot migration) or the destination redirection filter (after hot migration).

The method of FIG. 5 begins at step 502, where the redirection filter receives an IP packet from a VM. Then, at step 504, the redirection filter examines the header of the IP packet and reads the destination IP address and IP port of the IP packet. If the destination IP address and IP port pair is that of an immobile storage service, as determined at step 506, and a proxy 136 for the immobile storage service has been set up, as determined at step 508, step 510 is executed. Otherwise, the method ends.

At step 510, the redirection filter changes the destination IP address and IP port in the IP packet from that of the immobile storage service to that of the proxy that has been set up for the immobile storage service. The method ends after 510.

After the method of FIG. 5 ends, the IP packet is transmitted and routed according to its destination IP address and IP port.

Figure 6:
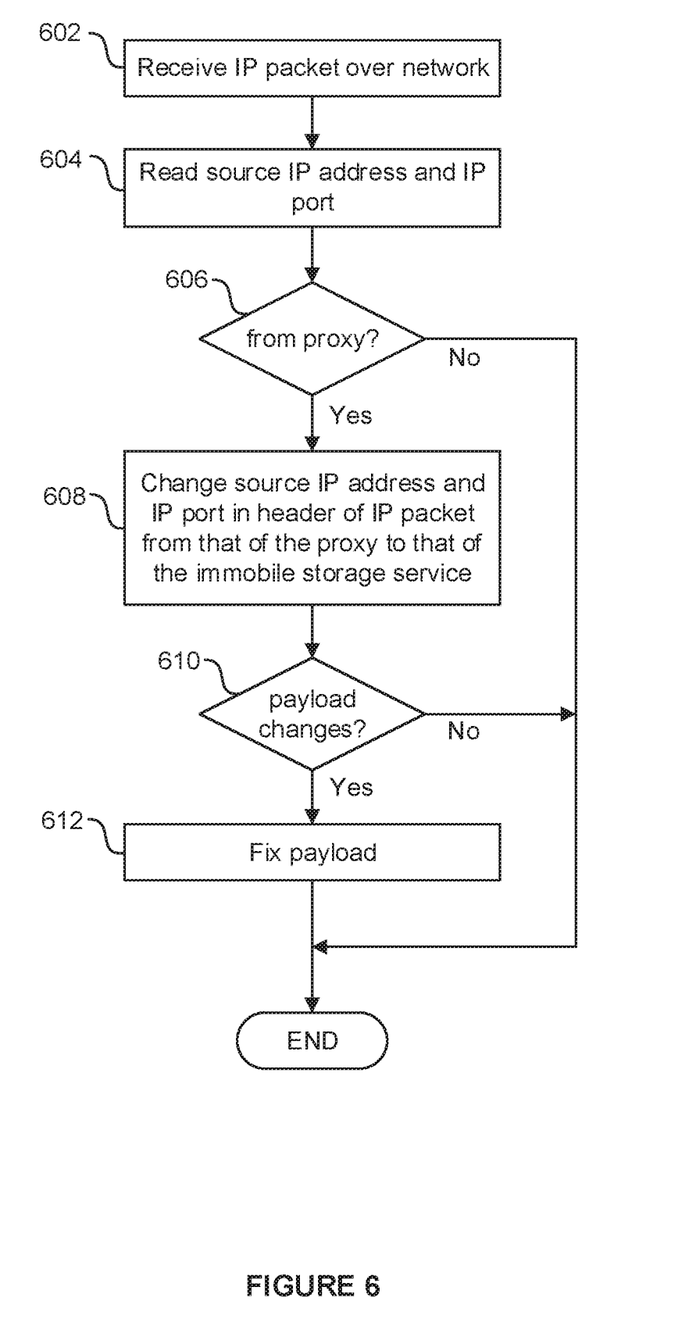
FIG. 6 is a flow diagram that illustrates a method of processing inbound IP packets from a proxy.

FIG. 6 is a flow diagram that illustrates a method of processing inbound IP packets from a proxy. The method of FIG. 6 is carried out by a redirection filter, e.g., either the source redirection filter (before or during hot migration) or the destination redirection filter (after hot migration).

The method of FIG. 6 begins at step 602, where the redirection filter receives an IP packet transmitted over a network. Then, at step 604, the redirection filter examines the header of the IP packet and reads the source IP address and IP port of the IP packet. If the source IP address and IP port pair is that of a proxy 136 that has been set up for an immobile storage service, as determined at step 606, the redirection filter at step 608 changes the source IP address and IP port in the IP packet from that of the proxy 136 to that of the immobile storage service. If the source IP address and IP port pair does not match an IP address and IP port of a proxy 136 that has been set up for an immobile storage service, the method ends.

After the source IP address and IP port are changed at step 608, the redirection filter determines at step 610 if the payload of the inbound IP packet needs to be changed, e.g., because there is information in the payload that is specific to a protocol. For example, if the inbound IP packet is a response to a REST call (e.g., an HTTP GET request), the redirection filter may need to change each URL in the payload that identifies a retrieval location of data from that of the proxy to that of the immobile storage service. If a change is needed (step 610, Yes), the redirection filter at step 612 changes the payload to include the retrieval location of the data in the immobile storage service instead of the proxy. If a change is not needed (step 610, No), the method ends.

The various embodiments described herein may employ various computer-implemented operations involving data stored in computer systems. For example, these operations may require physical manipulation of physical quantities—usually, though not necessarily, these quantities may take the form of electrical or magnetic signals, where they or representations of them are capable of being stored, transferred, combined, compared, or otherwise manipulated. Further, such manipulations are often referred to in terms such as producing, identifying, determining, or comparing. Any operations described herein that form part of one or more embodiments of the invention may be useful machine operations. In addition, one or more embodiments of the invention also relate to a device or an apparatus for performing these operations. The apparatus may be specially constructed for specific required purposes, or it may be a general-purpose computer selectively activated or configured by a computer program stored in the computer. In particular, various general-purpose machines may be used with computer programs written in accordance with the teachings herein, or it may be more convenient to construct a more specialized apparatus to perform the required operations.

The various embodiments described herein may be practiced with other computer system configurations including hand-held devices, microprocessor systems, microprocessor-based or programmable consumer electronics, minicomputers, mainframe computers, and the like.

One or more embodiments of the present invention may be implemented as one or more computer programs or as one or more computer program modules embodied in one or more computer readable media. The term computer readable medium refers to any data storage device that can store data which can thereafter be input to a computer system. Computer readable media may be based on any existing or subsequently developed technology for embodying computer programs in a manner that enables them to be read by a computer. Examples of a computer readable medium include a hard drive, NAS, read-only memory (ROM), RAM (e.g., flash memory device), Compact Disk (e.g., CD-ROM, CD-R, or CD-RW), Digital Versatile Disk (DVD), magnetic tape, and other optical and non-optical data storage devices. The computer readable medium can also be distributed over a network coupled computer system so that the computer readable code is stored and executed in a distributed fashion.

Although one or more embodiments of the present invention have been described in some detail for clarity of understanding, it will be apparent that certain changes and modifications may be made within the scope of the claims. Accordingly, the described embodiments are to be considered as illustrative and not restrictive, and the scope of the claims is not to be limited to details given herein but may be modified within the scope and equivalents of the claims. In the claims, elements and/or steps do not imply any particular order of operation, unless explicitly stated in the claims.

Virtualization systems in accordance with the various embodiments may be implemented as hosted embodiments, non-hosted embodiments or as embodiments that tend to blur distinctions between the two, are all envisioned. Furthermore, various virtualization operations may be wholly or partially implemented in hardware. For example, a hardware implementation may employ a look-up table for modification of storage access requests to secure non-disk data.

Many variations, modifications, additions, and improvements are possible, regardless the degree of virtualization. The virtualization software can therefore include components of a host, console, or guest operating system that performs virtualization functions. Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the invention. In general, structures and functionalities presented as separate components in exemplary configurations may be implemented as a combined structure or component. Similarly, structures and functionalities presented as a single component may be implemented as separate components. These and other variations, modifications, additions, and improvements may fall within the scope of the appended claims.

What is claimed is:

1. A method of migrating a first virtual machine (VM) from a first data center to a second data center, wherein a proxy is configured in the second data center with connection information to connect to a data store in the first data center to enable the proxy to handle input/output operations (IOs) of the first VM in place of the data store, said method comprising:
installing a first redirection filter in the first data center to redirect IOs from the first VM, which are directed to the data store, to the proxy;
migrating a memory state of the first VM to a second VM in the second data center;
installing a second redirection filter in the second data center to redirect IOs from the second VM, which are directed to the data store, to the proxy; and
after the migrating has completed, deactivating the first VM and powering on the second VM.

2. The method of claim 1, wherein, using the connection information, all of the data of the first VM stored in the data store are cached by the proxy.

3. The method of claim 1, wherein the first VM is configured to issue IOs according to a storage protocol of the data store and the proxy is configured to perform IOs issued by the first VM according to the storage protocol of the data store.

4. The method of claim 1, wherein execution of the first VM is supported by a first hypervisor installed in a first host computer, which is in the first data center, and execution of the second VM is supported by a second hypervisor installed in a second host computer, which is in the second data center.

5. The method of claim 4, wherein the first redirection filter is implemented in the first hypervisor to handle IOs from the first VM and the second redirection filter is implemented in the second hypervisor to handle IOs from the second VM.

6. The method of claim 1, wherein IOs from a third VM executing in the second data center are directed to the proxy.

7. The method of claim 1, wherein the first redirection filter is configured to read a destination IP address of outbound packets from the first VM, and upon determining that the destination IP address of the outbound packets from the first VM is an IP address of the data store, change the destination IP address of the outbound packets from the IP address of the data store to an IP address of the proxy.

8. The method of claim 1, wherein the first redirection filter is configured to determine whether or not inbound packets are from the proxy, and upon determining that the inbound packets are from the proxy, change a source IP address of the inbound packets from an IP address of the proxy to an IP address of the data store.

9. The method of claim 8, wherein the first redirection filter is further configured to change each URL in a payload of the inbound packets that identifies a retrieval location of data, from that of the proxy to that of the data store.

10. The method of claim 1, wherein the first data center is a public cloud computing data center and the second data center is a private cloud computing data center.

11. A computer system comprising:
a first data center including a first host computer having a first hypervisor configured therein to support execution of a first VM, and a data store to which the first VM issues IOs; and
a second data center including a second host computer having a second hypervisor configured therein to support execution of a second VM, and a proxy configured with connection information to connect to the data store in the first data center to enable the proxy to handle the IOs in place of the data store, wherein
the first hypervisor includes a first redirection filter that redirect IOs from the first VM, which are directed to the data store, to the proxy, and
the second hypervisor includes a second redirection filter that redirect IOs from the second VM, which are directed to the data store, to the proxy.

12. The computer system of claim 11, wherein all of the data of the first VM stored in the data store are cached by the proxy.

13. The computer system of claim 11, wherein the first VM and the second VM are each configured to issue IOs according to a storage protocol of the data store and the proxy is configured to perform IOs issued by the first or second VM according to the storage protocol of the data store.

14. The computer system of claim 11, wherein IOs from a third VM executing in the second data center are directed to the proxy.

15. The computer system of claim 11, wherein the second redirection filter is configured to read a destination IP address of outbound packets from the second VM, and upon determining that the destination IP address of the outbound packets from the second VM is an IP address of the data store, change the destination IP address of the outbound packets from the IP address of the data store to an IP address of the proxy.

16. The computer system of claim 11, wherein the second redirection filter is configured to determine whether or not inbound packets are from the proxy, and upon determining that the inbound packets are from the proxy, change a source IP address of the inbound packets from an IP address of the proxy to an IP address of the data store.

17. The computer system of claim 16, wherein the second redirection filter is further configured to change each URL in a payload of the inbound packets that identifies a retrieval location of data, from that of the proxy to that of the data store.

18. The computer system of claim 11, wherein the first data center is a public cloud computing data center and the second data center is a private cloud computing data center.

19. A non-transitory computer readable medium comprising instructions executed in a computer system to carry out a method of migrating a VM from a first data center to a second data center, wherein a proxy is configured in the second data center with connection information to connect to a data store in the first data center to enable the proxy to handle IOs of the VM in place of the data store, said method comprising:
  installing a first redirection filter in the first data center to redirect IOs from a first VM, which are directed to the data store, to the proxy;
  migrating a memory state of the first VM to a second VM in the second data center;
  installing a second redirection filter in the second data center to transmit IOs from the second VM, which are directed to the data store, to the proxy; and
  after the migrating has completed, deactivating the first VM and powering on the second VM.

20. The non-transitory computer readable medium of claim 19, wherein all of the data of the first VM stored in the data store are cached by the proxy.

* * * * *